US006683800B2

(12) United States Patent
Loef et al.

(10) Patent No.: US 6,683,800 B2
(45) Date of Patent: Jan. 27, 2004

(54) RESONANT SWITCHED MODE POWER SUPPLY SYSTEM

(75) Inventors: Christoph Loef, Aachen (DE); Christian Hattrup, Herzogenrath (DE); Thomas Scheel, Aachen (DE); Olaf Maertens, Hamburg (DE); Martin Ossmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/150,038

(22) Filed: May 16, 2002

(65) Prior Publication Data

US 2003/0021127 A1 Jan. 30, 2003

(30) Foreign Application Priority Data

May 16, 2001 (DE) .......................... 101 23 789

(51) Int. Cl.[7] .............................................. H02M 7/517
(52) U.S. Cl. .............................. 363/49; 363/17; 363/98
(58) Field of Search .............................. 363/17, 49, 95, 363/98

(56) References Cited

U.S. PATENT DOCUMENTS

| | | | | |
|---|---|---|---|---|
| 4,694,383 A | * | 9/1987 | Nguyen et al. | 363/98 |
| 4,719,558 A | * | 1/1988 | Hanada et al. | 363/98 |
| 5,057,698 A | * | 10/1991 | Widener | 363/17 |
| 5,936,851 A | * | 8/1999 | Hickman | 363/17 |
| 6,130,831 A | * | 10/2000 | Matsunaga | 363/98 |
| 6,324,080 B1 | * | 11/2001 | Laeuffer | 363/98 |
| 6,351,401 B1 | | 2/2002 | Scheel et al. | |
| 6,400,590 B2 | * | 6/2002 | Hickman | 363/17 |

FOREIGN PATENT DOCUMENTS

EP            0 884 830            6/1998

OTHER PUBLICATIONS

Hattrup, et al.; Fast estimation of unknown resonant frequencies by means of the VeCon chip set; ENE '97; pp. 3.353–3.357.

* cited by examiner

*Primary Examiner*—Jeffrey Sterrett
(74) *Attorney, Agent, or Firm*—Eugene E. Clair, Esq.

(57) ABSTRACT

In order to determine the necessary operating parameters of a power supply system with a converter for supplying a resonant arrangement having a transformer, a system having a measuring device is proposed, which activates the converter so that with components of the power supply system initially unenergized a predetermined output voltage is generated, one or more parameters characteristic of the resonant arrangement being determined from the measurement of the resonant current appearing on the primary side of the transformer. In this, after a preferably brief excitation interval, the resonant frequency, the impedance of the resonant arrangement, the capacitance value of the resonant capacitance and the leakage inductance are determined on the basis of the current path.

13 Claims, 4 Drawing Sheets

RESONANT SWITCHED MODE POWER SUPPLY SYSTEM

BACKGROUND

The invention relates to a power supply system and is particularly related to an X-ray unit having a power supply system and a method for determining operating parameters of a power supply system.

Switched-mode power supplies are frequently used for the power or voltage supply of electrical consumers. Such switched-mode power supplies usually convert the mains voltage into such voltages as are necessary for the operation of the respective consumers. Known switched-mode power supplies comprise an inverter or converter, which generates a switched a-c voltage from a d-c voltage. For this purpose such a converter has controllable switches. This switched a-c voltage (converter output voltage) is converted by a transformer into an a-c voltage having a suitable amplitude for the respective consumer, that is to say, it is stepped up or stepped down. If the consumer requires a d-c voltage supply, the secondary-side transformer-a-c voltage is rectified and generally stabilized by means of a smoothing capacitor.

In order to optimize the operation, switched-mode power supplies are operated as resonant arrangements. In these, a resonant capacitance together with the leakage inductance of the transformer (which can be generated by a discrete inductance) forms a series resonant circuit, which where necessary is extended by the secondary-side winding capacitance of the transformer to form a series-parallel resonant circuit. In operation, the working frequency of the converter is selected so that this is close to the intrinsic resonant frequency of the load circuit. As a result the voltage drop at the impedance of the resonant circuit is minimal.

One example of embodiment of a switched-mode power supply is the voltage supply of an X-ray tube. X-ray tubes are supplied with voltages ranging from approx. 40 kV to 150 kV and currents of up to 1.3 A. A controller adjusts the tube voltage to the required set value. As a control variable, the controller uses the activation of the converter, i.e. the switching frequency and where applicable the duty cycle. The resonant circuits provided in this application are generally of a very high quality. As a result the transient response is largely dependent on the frequency. Tolerances of the components used, such as different capacitance values of the resonant capacitor, or different values for the leakage inductance of the transformer, due also to aging, affect the resonant frequency.

For control purposes, therefore, the ability to proceed from known values in the case of determinant variables of the controlled system—such as the capacitance of the resonant capacitance and the leakage inductance of the transformer—is of some interest. This can be ensured by the use of high-precision components, which is, however, correspondingly expensive. In addition, there is the problem of deviation in component values due to aging.

A power supply system, which is formed from a switched-mode power supply with an additional control device has already been described in the article "Fast estimation of unknown resonant frequencies by means of the VeCon chip set", EPE'97 Trondheim, 1997, Vol. 3, pp. 353–357. The control device has a current sensor for measuring the current on the primary side of the transformer and a control output for controlling the converter. The control device comprises a measuring device for determining the resonant frequency of the controlled resonant circuit. In the operation of the power supply system, in which the converter is operated at a switching frequency f, the path of the primary-side current is monitored by means of sample values. The resonant frequency is estimated from the sample values and the converter is adjusted according to the estimate, so that the power supply system is operated precisely at the resonant frequency.

With the control method indicated, stable operation is possible in the event of sudden fluctuations. For this purpose, however, monitoring of the primary-side current is necessary in routine operation, which gives rise to difficulties in measurement. Moreover, the "on-line" method used is expensive, so that only very simple adjustments of the activation—in this case the excitation frequency—are possible.

SUMMARY OF THE INVENTION

An object of the invention, therefore, is to propose a power supply system and a method for determining operating parameters thereof, and in particular an X-ray unit having such a power supply system, by means of which the necessary operating parameters can be determined with particular ease.

This object is achieved by a power supply system in accordance with one embodiment of the present invention includes a converter for the generation of a switched converter output voltage ($U_w$) and a transformer. The primary side of the transformer is fed by the converter and has a load output connected to its secondary side. The power supply having at least one resonant capacitance ($C_r$), which forms a resonant arrangement with a leakage inductance ($L_r$) of the transformer and/or an external inductance. A measuring device is included for determining operating parameters of the power supply system. The measuring device having a current sensor for measuring the current ($i_r$) on the primary side of the transformer. The power supply includes means for controlling the converter wherein the measuring device is designed so that it activates the converter so that with initially unenergized components of the power supply system, a predetermined converter output voltage ($U_w$) is generated. One or more parameters ($f_0$, $Z_0$, $C_r$, $L_r$) characteristic of the resonant arrangement are determined from the measurement of the current ($i_r$) on the primary side of the transformer.

In accordance with a method applying principles of the present invention for determining operating parameters of a power supply system having a converter for generating a converter output voltage ($U_w$), a transformer supplied thereby, a leakage inductance ($L_r$) and/or an external inductance in combination with a resonant capacitance ($C_r$) form a resonant arrangement, the system having a load output which is connected to the secondary side of the transformer wherein the method includes the steps of ensuring that the components of the power supply system (10) are unenergized, activating the converter (12) so that a predetermined converter output voltage ($U_w$) is generated at least for a brief excitation interval, measuring the current ($i_r$) appearing on the primary side of the transformer at least during the excitation interval and determining one or more parameters characteristic of the resonant arrangement from the measurement of the current ($i_r$).

The power supply system has a converter and a transformer supplied by the latter. The converter in turn has a voltage supply, usually a d-c voltage supply (intermediate circuit voltage) from which, by clocked switching, it generates an a-c voltage of a frequency predetermined by the activation. A converter may have two such switches, for example, converter topologies with four power switches also being usual. A further variant of a converter topology is specified, for example, in EP 884 830. In the context of the invention the precise design of the converter does not matter.

The converter output voltage feeds a transformer, which may likewise be of any construction and may have different numbers of turns, transformation ratios, numbers, tappings etc—depending on the design of the system. The transformer generally has a certain winding capacitance, which can play a part in the behavior of the controlled system. On the secondary side, the output voltage of the transformer is often rectified and smoothed by means of a smoothing capacitor. A resonant capacitance, which is usually connected in series on the primary side, forms a resonant arrangement together with the leakage inductance of the transformer.

Also forming part of the power supply system is a measuring device, which has a current sensor and means for activating the converter. The measuring device controls the measuring operation through the activation of the converter and performs current measurements via the current sensor. In practical implementation, the measuring device can assume various forms, generally being a circuit with a microprocessor or signal processor, to which the measured values are fed in digital form. The measuring device need not necessarily be a separate circuit; if there is already a microprocessor unit for performing a digital control, for example, the measuring device may also be designed as an additional function of this existing circuit.

The measuring device performs the measurement with the components of the power supply systems initially unenergized, i.e. when the capacitances have been discharged and there is no current flowing through the inductances. This can be ensured, for example, if the discharge behavior of the energy storage devices present in the system (such as capacitors) is known, by a sufficiently long waiting time since last switching on the power supply system,.

At the start of the measuring operation the measuring device activates the converter so that a predetermined converter output voltage is generated. Here the converter is preferably activated in such a way that the converter output voltage is a d-c voltage. In a further embodiment of the invention the converter output voltage is switched on only for a brief excitation interval and the switches of the converter are then actuated so that thereafter there is no further voltage present. The length of the excitation interval hereby defined should be as short as possible, for example not more than ten full oscillation cycles (although the precise length of an oscillation cycle is unknown, from the order of magnitude the length is predetermined by the components used). The preference is for a smaller number of cycles, if possible fewer than four, the particular preference even being an excitation interval of less than one cycle duration, but at least equal to one half cycle. In one possible embodiment, an estimate of the parameter sought is already obtained from the first oscillation cycle, and the result then verified by reference to the further oscillations. This is only valid, however, as long as the output voltage remains very small, that is to say a close approximation to a short-circuit can be assumed on the secondary side.

The current appearing is measured by means of the current sensor. The invention here utilizes the finding that owing to the (initially discharged) secondary-side capacitances (winding capacitance of the transformer and the smoothing capacitor) the power supply system at the instant of start-up can be regarded as short-circuited on the secondary side. Here the excitation interval is preferably greater than the observation interval, so that the resonant current can be measured without further influencing. For a measurement in the preferred short observation interval of a few oscillations, the approximation has only a small error; indeed if just the first half-oscillation is considered, a sinusoidal current path is set up with great accuracy. The path of the current is measured by the current sensor, the most important parameters of the resonant circuit, here formed from the resonant capacitance and the leakage inductance of the transformer, being measured from this path. These parameters are the resonant frequency, the impedance and the values for the resonant capacitance and resonant inductance, these four values varying as a function of one another, so that there is only a need to determine any two of the values, in order to establish the rest.

In various embodiments of the invention, different methods are proposed for determining the parameters of the power supply system that are of interest, that is the resonant frequency, the impedance and/or the values for the leakage inductance and the resonant capacitance.

The resonant frequency can easily be determined by calculating the length of time between two zero crossings of the sinusoidal resonant current occurring in the excitation. If the measurement of the current is not continuous, but merely in the form of sample values, the zero crossings can be determined by interpolation or extrapolation of sample values. The error level found here is very low owing to the relatively constant gradient of a sine function in the area of the zero crossing.

Alternatively, the measuring device can determine the resonant frequency by matching a sine function to the sample values for the current. The term "matching" is meant to imply the identification of a suitable sine function, which with regard to a degree of error approximates as closely as possible to the sampling points. A match is preferred in which the degree of error in the form of the mean square error is minimized.

Various measuring methods are also proposed for determining the impedance and the values for the resonant capacitance and inductance. The impedance can be determined with particular ease if the values for the primary-side current and the primary-side voltage are known. The primary-side voltage is predetermined by the excitation, i.e. by the converter output voltage. This is preferably constant at a known value, alternatively it can be also be measured continuously. The current path is, as stated above, to be regarded as approximately sinusoidal, at least for the first oscillation cycles. Once the excitation voltage is known, the impedance can thereby be determined very easily if the maximum value (amplitude) of the current is known.

Given a sufficient number of sample values within an oscillation cycle, the current maximum can be determined by using the maximum for the sample values. Owing to the flat characteristic of a sinusoidal curve in the area of its maximum, only a very slight error is thereby produced. According to an alternative method the amplitude of the current is calculated from sample values by matching a sine function to the sample values. This is particularly easy if the resonant frequency has already been determined by one of the aforementioned methods.

In a further embodiment of the invention the power supply system has a control device by means of which the output-side variables, such as the output voltage, can be controlled. As control variable, the control device uses the activation of the converter (e.g. the switching frequency and/or the duty cycle). Of particular importance for the design of the controller here are the previously determined parameters of the controlled system, namely the resonant frequency, impedance and/or values for resonant capacitance and inductance. The control device therefore preferably uses these previously determined parameters, so that a very precise control is possible.

This is particularly relevant, for example, in the case of X-ray units in which a highly accurate control is necessary. Stringent specifications with regard to overshoot, correction time and form of voltage run-up apply to the operation of an X-ray tube, i.e. switching on and running up the voltage to the required value. A controller adaptation enables these specifications to be met even if the components used have larger tolerances or an aging characteristic. For this purpose, for example, the prescribed measuring process can be carried out after each service interval of an X-ray unit, in order to determine the necessary parameters of the controlled system. These are then relayed to the control device where they are stored, so that in further operation the control device can operate with very precise information on the behavior of the controlled system.

The present invention provides the foregoing and other features hereinafter described and particularly pointed out in the claims. The following description and accompanying drawings set forth certain illustrative embodiments of the invention. It is to be appreciated that different embodiments of the invention may take form in various components and arrangements of components. These described embodiments being indicative of but a few of the various ways in which the principles of the invention may be employed. The drawings are only for the purpose of illustrating a preferred embodiment and are not to be construed as limiting the invention.

BRIEF DESCRIPTION OF THE DRAEINGS

The invention will be further described with reference to examples of embodiment shown in the drawings to which, however, the invention is not restricted. In the drawings.

DETAILED DESCRIPTION

Figure 1:
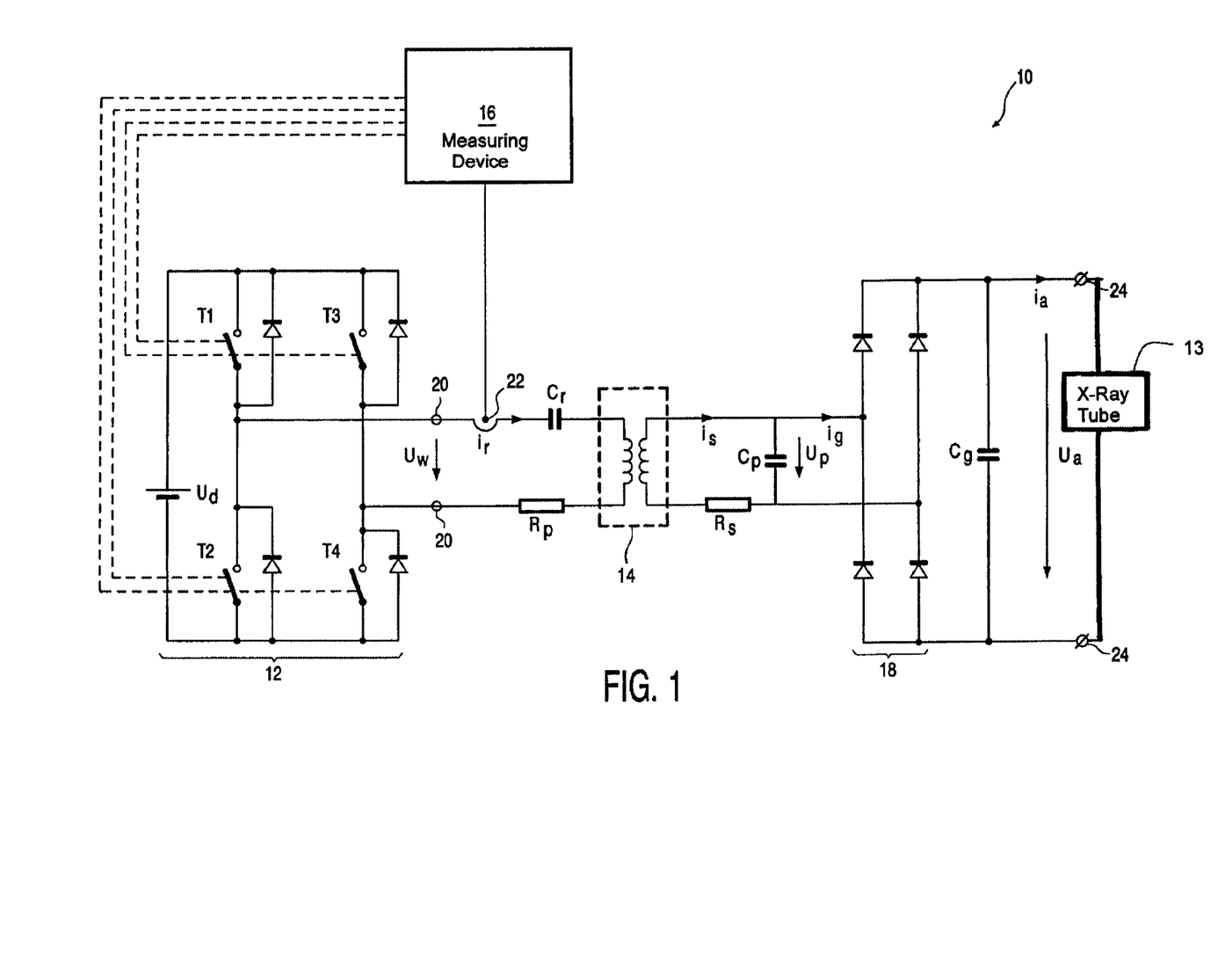
FIG. 1 shows a circuit diagram of a power supply system.

Referring to FIG. 1, a circuit diagram illustrates a power supply system 10, which has a converter 12, a transformer 14, a measuring device 16 and a rectifier 18. The converter 12 has four controlled power switches $T_1$, $T_2$, $T_3$, $T_4$ here represented only symbolically. A d-c voltage source $U_d$ supplies the converter 12 with voltage. According to the position of the switches $T_1$ to $T_4$, a converter output voltage $u_w$ can be generated on the output connections 20, which is either $U_d$, 0 or $-U_d$. If, for example, the switches $T_1$ and $T_4$ are closed, while $T_2$ and $T_3$ remain open, the converter output voltage $u_w$ is equal to the supply voltage $U_d$ of the converter. The supply voltage $U_d$, which is here drawn in as voltage source, is in practice usually a rectified mains voltage (intermediate circuit voltage).

The primary side of the transformer 14 is connected to the converter outputs 20. A resonant capacitance $C_r$ is connected in series with this. The resistance $R_P$ drawn in represents the winding resistance of the primary side of the transformer.

The current $i_r$ flows on the primary side. A current sensor 22 is provided for measurement of this current. The measured value registered is evaluated by the measuring device 16.

The transformer 14 is selected for the particular application of the power supply system 10. For example, for the high-voltage supply of an X-ray tube 13 (shown in phantom) the voltage is stepped up by a high-voltage transformer.

The rectifier 18, in this case a conventional bridge rectifier, is connected to the transformer 14 on the secondary side. The capacitance $C_p$ represented in FIG. 1 and the resistance $R_s$ represent the winding capacitance and the winding resistance of the secondary side of the transformer 14. The bridge rectifier 18 has output connections 24, between which the smoothing capacitor $C_g$ is connected in parallel for smoothing the output voltage $U_a$. The x-ray tube 13 is connected to the output connections 24.

The power supply system 10 has a controller 11 (shown in phantom as a discrete component or may be included in other components of the power supply system having control capabilities), which in order to obtain a given output voltage $U_a$ is operatively connected to the power supply system 10 to activate the converter 12 accordingly. It is to be remembered with regard to this control that it is a resonant arrangement. The transformer 14 has a leakage inductance $L_r$, which together with the resonant capacitance $C_r$ forms a series resonant circuit. The secondary-side winding capacitance of the transformer 14 expands the system into a series-parallel resonant circuit.

In operation, the working frequency of the converter 12 is chosen so that it lies close to the intrinsic-resonance of the load circuit. The intrinsic resonant frequency here varies decisively as a function of the capacitance value of the resonant capacitance $C_r$ and the value of the leakage inductance $L_r$ of the transformer 14. If components with considerable tolerances are used here, the component values must first be determined in order to have the information on the controlled system needed to design the controller. Such precise information is particularly necessary in the case of voltage supplies for X-ray tubes. In this case very tight regulations exist with regard to rapid running-up of the voltage without overshoot.

The necessary information on the controlled system, i.e. the resonant frequency, the impedance of the resonant circuit and the values for the capacitance of the resonant capacitance $C_r$ and the leakage inductance $L_r$ are determined by the measuring device 16. At the same time, these values naturally vary as a function of one another, i.e. from any two of these values it is possible to determine the remainder. The measuring device 16, which is not represented in more detail, contains a microprocessor with suitable control electronics for the switches $T_1$ to $T_4$ of the converters 12 and an A/D converter for evaluation of the measured values of the current sensor 22 in digital form. The value of the voltage $U_d$, i.e. the supply voltage of the converter 12 is also known to the measuring device 16. The measuring device is in a position to detect and process the necessary measured values at known, preferably equidistant sampling points.

The measuring device 16 autonomously and automatically performs the measuring process, described below, for determining the parameters, and evaluates the measurements performed in the process.

On commencing the measurement it is assumed that the resonant circuit is unenergized, i.e. all capacitors are dead and the output voltage $U_a$ has the value zero. This state can be produced by purposely discharging the energy storage devices present in the circuit, but a sufficiently long waiting time after switching the circuit off usually suffices. Here the discharging time for the capacitors is known, so that for an actual circuit it can easily be determined when it is possible to assume, with sufficient accuracy for the measurement, that the energy storage devices are discharged. Alternatively it is also possible to perform the measuring process with (at least partially) charged energy storage devices. This makes the measurement considerably more difficult, however, since the prevailing charging state of the capacitors must be known and worked out.

Figure 2:
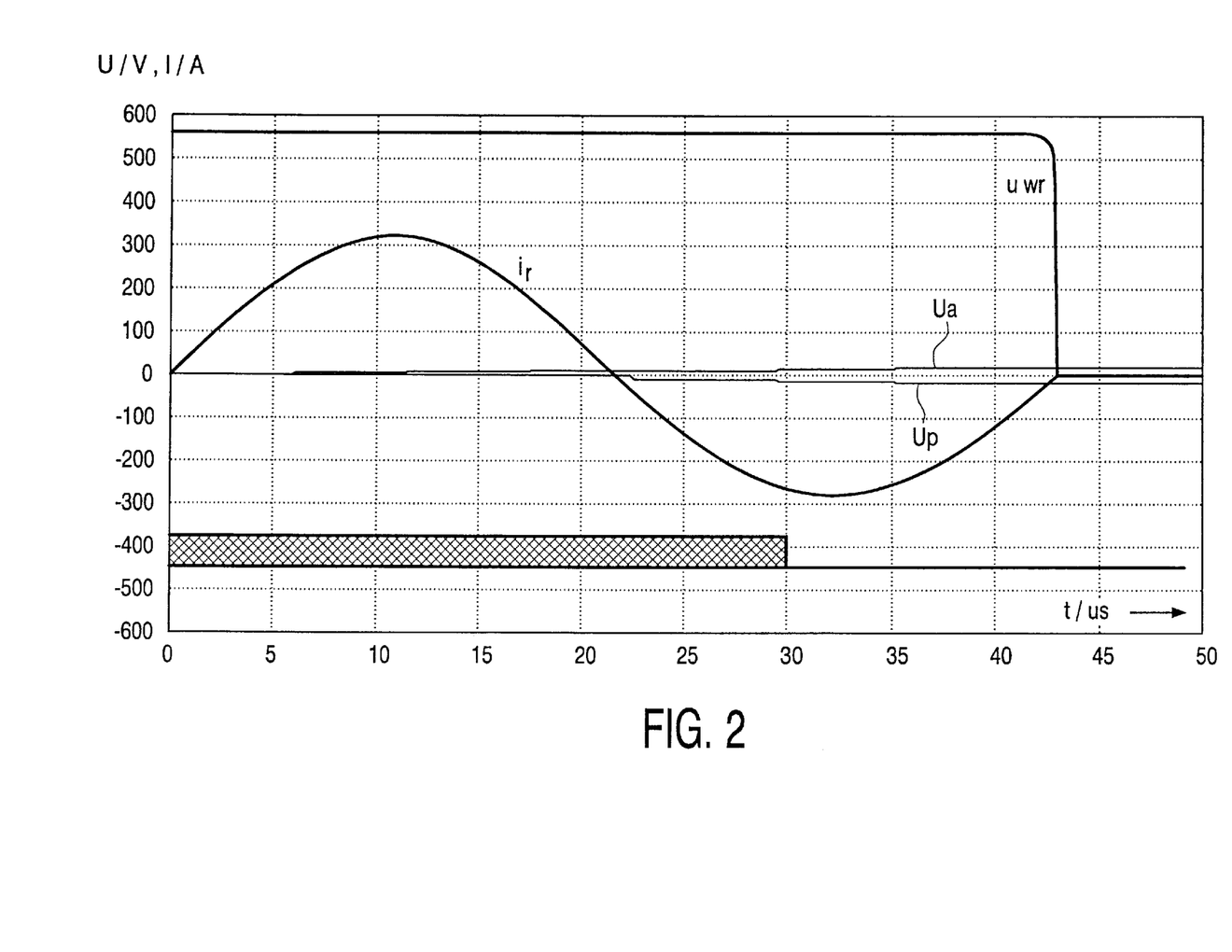
FIG. 2 shows a representation of the time curve of currents and voltages in FIG. 1.

If a diagonal of the inverter is now switched on at a time t=0 with power supply system 10 unenergized (e.g. $T_1$ and $T_4$) a voltage $u_w$ is present at the input 20 of the resonant circuit, which is equal to the magnitude of the intermediate circuit voltage $U_d$. The corresponding system variables are shown in FIG. 2. A resonant oscillation with a sinusoidal current path $i_r$ is set up in the series resonant circuit. The voltage $U_a$ forming on the smoothing capacitor $C_g$ is the integral of the amount of secondary-side current $i_g$.

Since at the start of the first resonant half-oscillation the capacitances $C_p$ and $C_g$ are dead, the two capacitors can be combined into an equivalent capacitor $C_{pg}=C_p+C_g$. The smoothing capacitance now operative is essentially greater than the series resonant capacitance $C_r$, so that the voltage forming on $C_{pg}$ voltage proves to be essentially smaller than the intermediate circuit voltage $U_d$. In this respect, the system may be regarded in a first approximation as short-circuited on the secondary side. Any influencing of the sinusoidal resonant oscillation of the current $i_r$ is therefore to be disregarded.

The system variables represented in FIG. 2 show primary-side related variables of a power supply system for an X-ray tube. The secondary-side variables for $U_p$ and $U_a$ are obtained by multiplying by the transformation factor. This gives typical values of 5.5 kV for $U_a$ after on half-cycle. The primary-side related output voltage is approx. 10 V; which corresponds to 1.8% of the nominal intermediate circuit voltage $U_d$ of 550 V. The slight rise in the output voltage ensures that the output-side capacitors $C_p$ and $C_g$ do not have any essential influence on the characteristics of the resonant oscillation in the load circuit. For the purposes of the following, its influence can therefore be disregarded.

The duration of one current half-oscillation is dependent upon the variables of the components $L_r$ (leakage inductance of the transformer 14) and $C_r$ (resonant capacitance). As shown in FIG. 2, the measuring device 16 therefore activates the converter 12 so that switches $T_1$ and $T_4$ are closed for a brief excitation interval (in this example 30 μs). The switches are then opened again. The duty cycle of the switches $T_1$ and $T_4$, i.e. the duration of the excitation interval should in this case be at least equal to the maximum expected half cycle duration of the series resonant circuit elements, in order that a half-oscillation is generated and can be observed without interference. This can be reliably achieved by having the switches $T_1$ and $T_4$ switch off during the polarity reversal of the resonant current $i_r$ or a predetermined brief waiting time thereafter. Since in an actual power supply system 10, however, the component values for $C_r$ and $L_r$ are known at least approximately, a fixed length can be set for the excitation interval, which ensures with a sufficient margin, that the excitation is at least equal to one half cycle duration.

The excitation voltage (in this case: $U_d$) should be constant during the excitation interval. Alternatively, if this cannot be guaranteed, for example, the value of the converter output voltage $U_w$ may also be measured. The measured values are fed to the measuring device 16, which calculates the effects of any fluctuations.

In FIG. 2 $U_{wr}$ denotes the converter output voltage. As shown, owing to the resonant current flowing even after the opening of all switches $T_1$, $T_2$, $T_3$, $T_4$, this at first persists on $+U_d$, the current then flowing via the diodes connected anti-parallel to the switches.

The path for the current $i_r$ appearing as represented in FIG. 2 is measured by the measuring device 16 by way of the current sensor 20. In a previously unenergized power supply system 10 a very good approximation is obtained of a purely sinusoidal oscillation (this applies particularly to the first cycle, and more especially to the first half-oscillation). By observing the oscillation appearing, it is possible to determine the information sought regarding the resonant elements $C_r$ and $L_r$ or the resonant impedance and resonant frequency. There are a number of possibilities here, which are explained below. In an actual embodiment, a suitable combination of the measuring methods presented below will be selected for the particular components available, in particular according to the processing speed available in the measuring device 16.

Description of the First Method for Determining the Intrinsic Resonant Frequency After energizing of the transistors $T_1$ and $T_4$ a sinusoidal resonant current is formed in the resonant circuit. The sinusoidal current $i_r$ of amplitude $I_p$ and the frequency $f_R$ can be reduced to the following expression:

$$I(t)=I_p*\sin(2\cdot\pi\cdot f_R\cdot t+\Phi) \tag{1}$$

Figure 3:
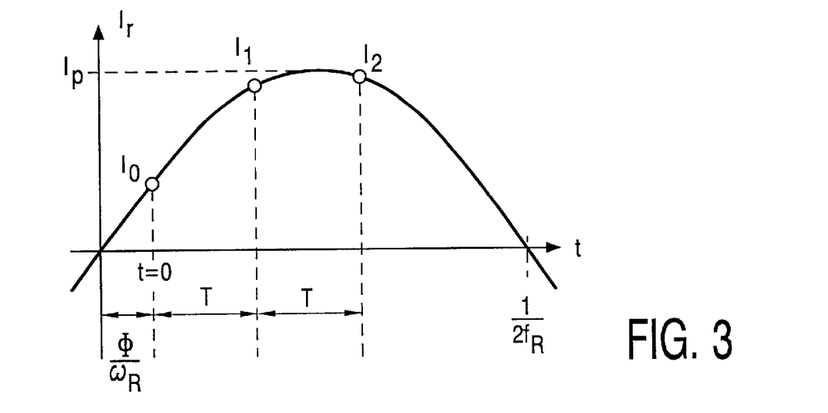
FIG. 3 gives a schematic representation of the current path.

As FIG. 3 shows, the current is measured at equidistant time intervals T.

The sample values of the current $$I_k=I(k\cdot T)$$

can be represented by a function with linear coefficients $$I_{k+1}=2\cdot\rho\cdot I_k-I_{k-1} \tag{2}$$

where $$\rho=\cos(2\cdot\pi\cdot f_R\cdot T)$$

the sampling interval being given by T.

This correlation can be used in order to determine the frequency $f_R$ from the measured current values $I_k$. Equation (2) may be regarded as estimator for $I_{k+1}$, based on $I_k$ and $I_{k-1}$. The local error of the estimator is obtained as $$e_k=I_{k+1}-2\cdot\rho\cdot I_k+I_{k-1}$$

For a sinusoidal signal this error becomes zero. It is small for current measured values that are caused by measuring errors and jitter. The value ρ can be determined by calculating the global estimation error E:

$$E = \sum_{k=1}^{N-2} e_k^2. \quad (3)$$

The global estimation error E is minimized by resolving the equation $$\frac{dE}{d\rho} = 0.$$

This leads to $$\hat{\rho} = \frac{\sum_{k=1}^{N-2}[I_k \cdot (I_{k-1} + I_{k+1})]}{2 \cdot \sum_{k=1}^{N-2}[I_k]^2} \quad (4)$$

as optimum value.

In order to calculate $\hat{\rho}$ a minimization of the mean square errors is therefore carried out, N measured values $I_k$ being used. For N=4, for example, the following is obtained $$\hat{\rho} = \frac{I_1 \cdot (I_0 + I_2) + I_2 \cdot (I_1 + I_3)}{2 \cdot (I_1^2 + I_2^2)} \quad (5)$$

In the next stage the resonant frequency is determined:

$$\hat{f}_R = \frac{1}{2 \cdot \pi \cdot T} \cdot \arccos(\hat{\rho}) \quad (6)$$

Figure 4:
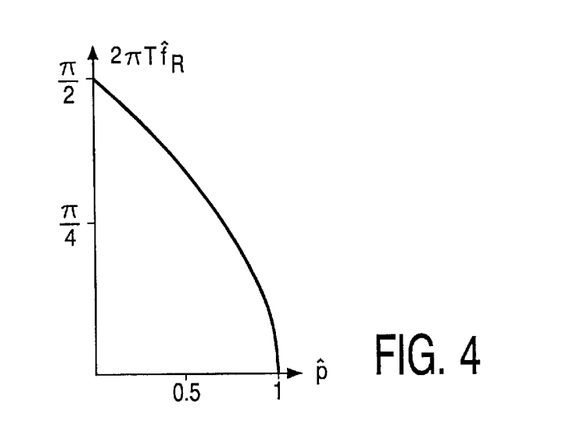
FIG. 4 shows a diagram, which represents the dependence of the estimated resonant frequency $\hat{f}_R$ on the estimation parameter $\rho$.

This is shown in FIG. 4. In a digital processor system the curve in stored in a table. In this case the resolution of $2 \cdot \pi \cdot \hat{f}_R \cdot T$ becomes fairly poor, when the values of $\hat{\rho}$ lie close to one.

If the number N of sampling points is increased, a higher accuracy can normally be achieved, although the time interval T between the individual sampling points is also reduced, which leads to a larger value for $\hat{\rho}$. This in turn reduces the stability of equation (6), as can be seen in FIG. 4. An N of four or five is therefore suggested, if account is taken of measuring error and jitter. Moreover, with fewer measuring points less calculation is required.

Description of the Second Method for Determining the Intrinsic Resonant Frequency Alternatively the resonant frequency can also be determined by a second method. The aim of this second method is to determine the resonant frequency from the interval between the current zero crossings. Since it is scarcely possible to measure the current zero crossing directly, the current is sampled equidistantly, in each case using two measuring points that lie closest to the current zero crossing for linear extrapolation or interpolation. In order to be able to detect the timing of the zero crossing as precisely as possible, the measurements must now be performed so as rapidly as possible one after another, so that a sufficiently large number of measuring points is available for the first half-cycle of the oscillation under consideration.

This method introduces only a slight error, since the gradient of a sine function varies only slightly in the area of the zero crossing.

Figure 5:
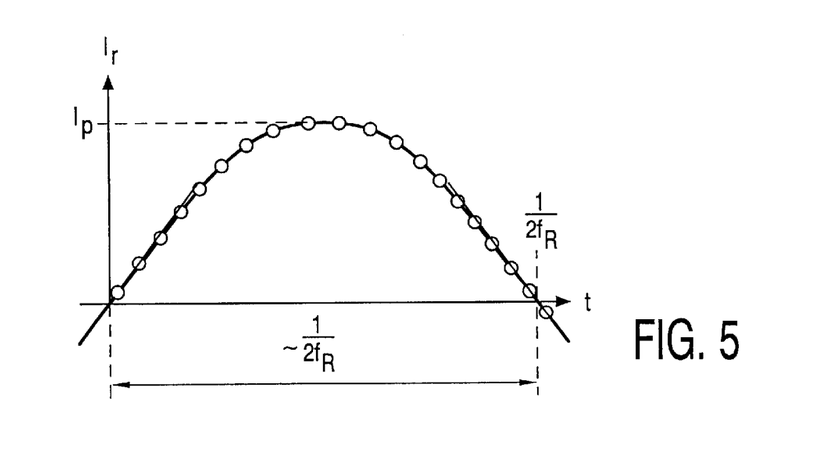
FIG. 5 gives a schematic representation of the current path with sampling points.

FIG. 5 shows that the first linear passage through linear extrapolation of the first two measuring points occurs after the zero crossing. An interpolation is not possible, since the sinusoidal oscillation is not encountered until this instant. The second zero crossing, however, is then determined by interpolation of the last positive value and the first negative value.

Description of the First Method for Determining the Impedance

If a series resonant circuit is energized by connecting a constant voltage, a damped sinusoidal current path appears (cf. FIG. 2):

$$i(t) = I_P \cdot e^{-d\omega_0 t} \cdot \sin(\sqrt{1-d^2} \cdot \omega_0 t)$$

i.e. a damped oscillation $$\left(d = \frac{R}{2\omega_0 L}\right)$$

with a slightly reduced resonant frequency ($\omega_1 = \omega_0 \sqrt{1+d^2}$) occurs. Given a high quality of the resonant circuit, however, the resistive component is very small and both effects can be disregarded. The following equation for an undamped oscillation is arrived at:

$$i(t) = I_P \cdot \sin(\omega_0 t), \text{ with}$$

$$I_P = \frac{U_d}{\sqrt{\frac{L}{C}}} = \frac{U_d}{Z_0}.$$

The impedance sought is then obtained as $$Z_0 = \frac{U_d}{I_P}.$$

With one of the methods described above it is possible to determine the resonant frequency. Now the amplitude $I_P$ of the resonant current, which is needed for calculation of the impedance, is also determined from the K measured current values. For the measured currents $$I_k = I_P \cdot \sin(\omega_0 \cdot k \cdot T + \Phi),$$

T representing the sampling interval and $\Phi$ the phase shift.

If the energizing instant is selected as t=0, the phase shift is equal to zero. Resolved according to $I_P$ the following correlation is obtained for each measured value:

$$I_P = \frac{I_k}{\sin(\omega_0 k t)} = \frac{I_k}{\sin(2\pi f_0 k T)}.$$

An averaging over impedances resulting from all evaluated measuring points can improve the result further. If a value is determined for the amplitude $I_P$ of the current, the impedance $Z_0$ can be calculated from this provided that $U_d$ is known. As already stated, it is preferable to work with a known, constant $U_d$. Alternatively $U_d$ can also be measured.

$$Z_0 = \frac{U_d}{I_P}.$$

If $f_0$ and $Z_0$ are known, it is possible to calculate the values for $C_r$ and $L_r$. The resonant inductance $L_r$ and the resonant capacitance $C_r$ are calculated from $f_n$ and $Z_0$ as follows:

From the known equations $$f_0 = \frac{1}{2\pi\sqrt{L_r C_r}} \text{ and } Z_0 = \sqrt{\frac{L_r}{C_r}}$$

the following are obtained through transposition and mutual substitution $$C_r = \frac{1}{2\pi \cdot f_0 \cdot Z_0} \text{ and } L_r = \frac{Z_0}{2\pi \cdot f_0}.$$

Second Method for Determining the Impedance

Alternatively the maximum value of the current can also be measured directly through more frequent sampling. Given a sufficient number of measured values, it is possible to determine the current maximum with satisfactory accuracy since, owing to the many measuring points and the flat curve of the sine function at the maximum, the largest measured value can simply be assumed to be the maximum. The current maximum is then used, as described above, to determine the self-impedance $Z_0$ of the circuit.

The parameters of the controlled system determined in this way are incorporated into the design of the controller for the power supply system 10. All conventional design techniques known to the person skilled in the art can be considered for the design of a corresponding controller. DE 199 40 137 describes a design method, in which the parameters $C_r$ and $L_r$ are used in the controller design.

If the design selected for the particular application requires quite a lot of calculation, like the method described in DE 199 40 137, it is advisable to perform the corresponding calculation for possible values of $L_r$ and $C_r$ beforehand and to store the controller parameters obtained in a table. Following measurement of the parameters by one of the methods described above, the controller parameters corresponding to the measured values are then located in this table and loaded into the controller. This is possible and advantageous particularly in cases where the values for $L_r$ and $C_r$ are known approximately but certain fluctuations may occur. A corresponding table can then be calculated and compiled with sufficiently small interval for $L_r$ and $C_r$, so that after measurement of the parameters the controller can be adjusted with corresponding precision.

Figure 6:
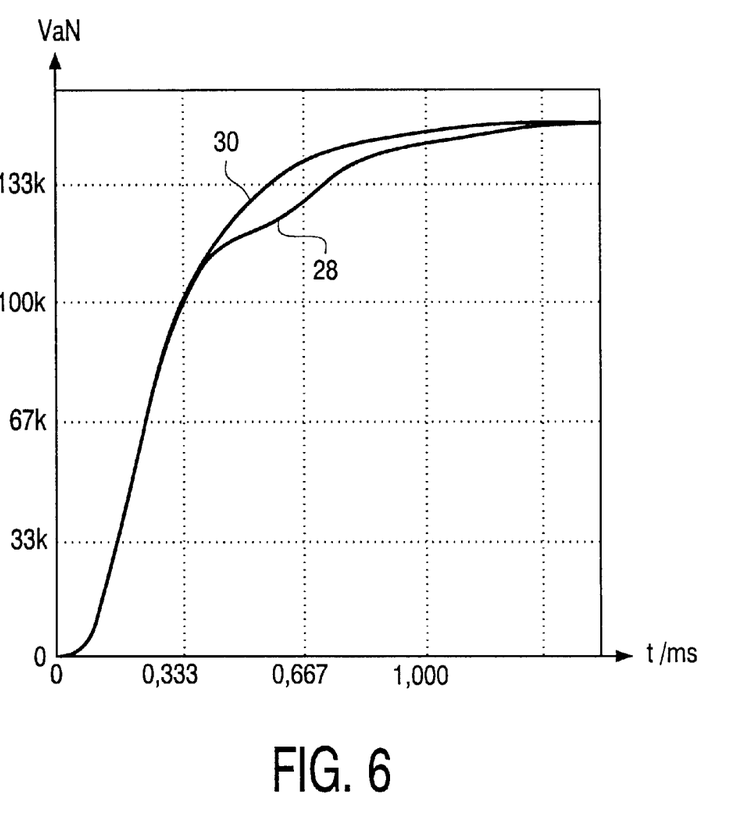
FIG. 6 gives a representation of the time curve of the output voltage.

FIG. 6 shows a "running-up" of the output voltage $U_a$ of a current supply 10 for an X-ray tube, controlled by the controller, already mentioned, from DE 199 40 137. In this the curve 28 shows the time characteristic of the output voltage $U_a$ in an instance where a deviation from design capacitance value of the controller occurs in a component, in this case $C_r$. For comparison, the curve 30 shows the time characteristic after measurement of the values for $C_r$ and $L_r$ and matching of the controller parameters of the voltage controller.

The invention can be summarized by saying that in order to determine the necessary operating parameters of a power supply system with a converter for supplying a resonant arrangement having a transformer, a system having a measuring device is proposed, which activates the converter so that, with components of the power supply system initially unenergized, a predetermined output voltage is generated, one or more parameters characteristic of the resonant arrangement being determined from the measurement of the resonant currents appearing on the primary side of the transformer. In this, after a preferably brief excitation interval, the resonant frequency, the impedance of the resonant arrangement, the capacitance value of the resonant capacitance and the leakage inductance are determined on the basis of the current path.

While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment, the following is claimed:

1. A power supply system comprising;
    a converter for the generation of a switched converter output voltage;
    a transformer having a primary side fed by the converter and a load output connected to a secondary side;
    at least one resonant capacitance forming a resonant arrangement with an inductance; and
    a measuring device for determining operating parameters of the power supply, the measuring device adapted to activate the converter to generate a predetermined converter output voltage when components of the power supply are initially un-energized;
    the measuring device comprising:
        a current sensor for sensing current on the primary side of the transformer; and
        control means for controlling the converter wherein one or more parameters characteristic of the resonant arrangement are determined from the measurement of the current on the primary side of the transformer.

2. A power supply system according to claim 1 wherein the measuring device is adapted to switch off the converter output voltage after a brief excitation interval.

3. A power supply system according to claim 1 wherein the measuring device is adapted to determine a resonant frequency by calculating at least one period of time between two zero crossings of the current from sample values of the current.

4. A power supply system according to claim 1 wherein the measuring device is adapted to determine a resonant frequency by adjusting a sine function on the basis of sample values of the current and minimize a degree of error.

5. A power supply system according to claim 1 wherein the measuring device is adapted to determine an amplitude of the current.

6. A power supply system according to claim 5 wherein the measuring device is adapted to calculate the amplitude of the current by determining at least one of a maximum or a minimum from sample values of the current.

7. A power supply system according to claim 5 wherein the measuring device is adapted to determine the amplitude of the current by matching a sine function to sample values of the current.

8. A power supply system according to claim 1 including a rectifier and at least one smoothing capacitor on the secondary side.

9. A power supply system according to claim 1 including a control device for controlling the output voltage, the control device using the determined operating parameters characteristic of the resonant arrangement to control the output voltage.

10. A power supply system according to claim 1 wherein the one or more parameters characteristic of the resonant arrangement being determined from the measurement of current include at least one of a frequency fo, an impedance Zo, a resonant capacitance Cr and a leakage inductance of the transformer Lr.

11. A method for determining operating parameters of a power supply system having a converter for generating a converter output voltage, a transformer supplied thereby, an inductance with which a resonant capacitance form a resonant arrangement, and a load output connected to the secondary side of the transformer, the method comprising the steps of:

ensuring that power supply system is not energized;

activating the converter to provide a predetermined converter output voltage at least for a brief excitation interval;

measuring the current appearing on the primary side of the transformer at least during the excitation interval; and determining at least one or more parameters characteristic of the resonant arrangement from the measurement of the current.

12. A method for determining operating parameters of a power supply system of claim 11 wherein the one or more parameters characteristic of the resonant arrangement being determined from the measurement of current include at least one of a frequency fo, an impedance Zo, a resonant capacitance Cr and a leakage inductance of the transformer Lr.

13. An x-ray system comprising:

a power supply system comprising;

a converter for the generation of a switched converter output voltage;

a transformer having a primary side fed by the converter and a load output connected to a secondary side;

at least one resonant capacitance forming a resonant arrangement with an inductance; and a measuring device for determining operating parameters of the power supply, the measuring device adapted to activate the converter to generate a predetermined converter output voltage when components of the power supply are initially un-energized; the measuring device comprising:

a current sensor for sensing current on the primary side of the transformer; and control means for controlling the converter wherein one or more parameters characteristic of the resonant arrangement are determined from the measurement of the current on the primary side of the transformer; and an x-ray tube operatively connected to the load output of the power supply system.

* * * * *